W. J. STOLZ.
FOLDING SEAT FOR PERAMBULATORS.
APPLICATION FILED JUNE 24, 1916.
1,217,658.
Patented Feb. 27, 1917.
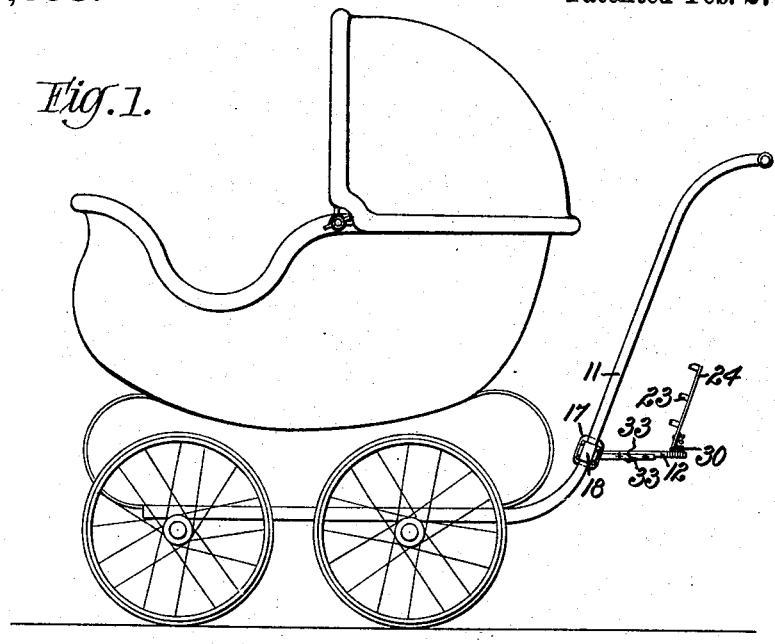
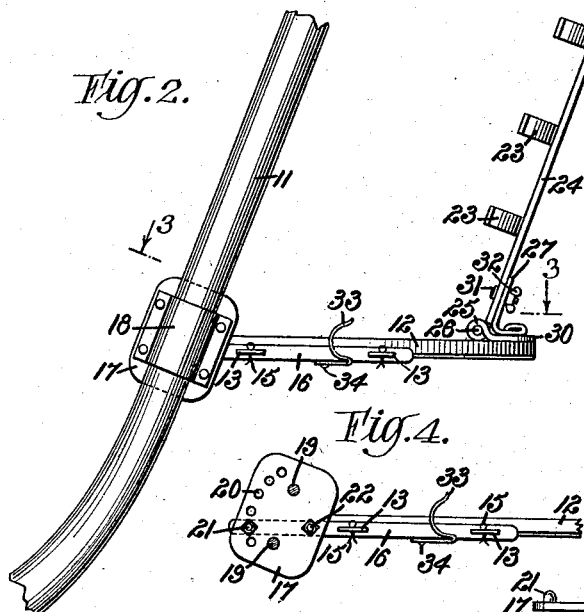
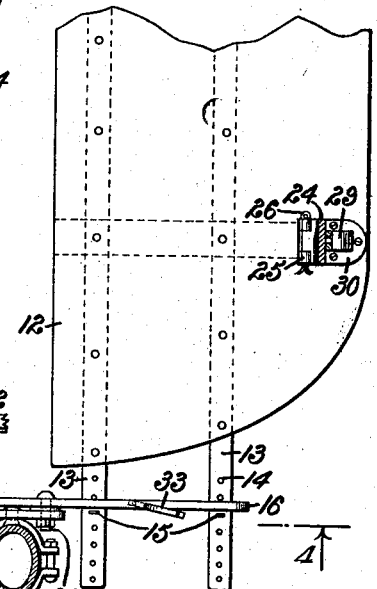
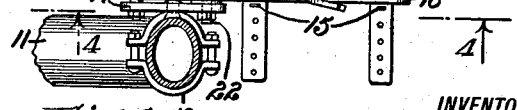
WITNESSES
Frederick Wiehl
Geo. Murdock
INVENTOR
W. J. Stolz
BY
ATTORNEYS

UNITED STATES PATENT OFFICE.

WILLIAM J. STOLZ, OF MILWAUKEE, WISCONSIN.

FOLDING SEAT FOR PERAMBULATORS.

1,217,658.   Specification of Letters Patent.   Patented Feb. 27, 1917.

Application filed June 24, 1916. Serial No. 105,548.

*To all whom it may concern:*

Be it known that I, WILLIAM J. STOLZ, a citizen of the United States, and a resident of Milwaukee, in the county of Milwaukee and State of Wisconsin, have invented a new and Improved Folding Seat for Perambulators, of which the following is a full, clear, and exact description.

Among the principal objects which the present invention has in view are: to provide an attachable seat for temporary use; to provide a seat which may be folded within small compass; to provide means for holding the seat inactively between the side members of the perambulator handle; to provide means for altering the active disposition of the seat; and to provide a seat which may be quickly disposed in active and inactive positions.

*Drawings.*

Figure 1 is a side view of a perambulator showing attached thereto in active position, a seat constructed and arranged in accordance with the present invention;

Fig. 2 is a detail view on an enlarged scale, showing a side of said seat and a fragment of the handle supporting the same;

Fig. 3 is a detail view on an enlarged scale, showing a fragment of the seat herein disclosed and the handle bars of a perambulator, the back support for the seat being shown in section, said section being taken as on the line 3—3 in Fig. 2;

Fig. 4 is an edge view of the bracket support and bracket attaching plate employed in the present invention, the view being taken as on a plane indicated by the line 4—4 in Fig. 3;

Fig. 5 is a section of one of the handle bars of the perambulator, showing the seat-supporting bracket and parts connected therewith;

Fig. 6 is a detail view in perspective of the stop plate employed for adjusting the back of the seat for service.

*Description.*

As shown in the drawings, a perambulator having end bars 11 of conventional construction, supports a seat 12 actively and inactively disposed. As shown in Fig. 1, the seat 12 is actively disposed and stands in a position substantially horizontal.

As shown best in Fig. 3 of the drawings, the seat 12 is furnished with light spring bars 13, the ends whereof have perforations 14 to receive adjusting pins 15 when the same are used. The bars 13 provide the necessary resiliency to the seat 12 to avoid jarring the child on the seat. The ends of the spring bars 13 are extended through slots in the bracket bars 16, as will be seen best in Fig. 4 of the drawings. The bars 16 are held by plates 17, which are clamped to the handle bars 11 by clamping collars 18. The fixed members of the collars 18 hold rigidly the plates 17, by means of the bolts 19. The angle of service position of the seat 12 may be varied from the horizontal, the adjusted position being determined by selecting one of the perforations 20 to receive the bolt 21. The bolts 22 are concentric with the path of the perforations 20, and form what may be termed the pivots on which the bracket bars 16 rotate.

The seat 12 is provided with a back, the cross rails 23 of which are supported by upright members 24. The members 24 are pivotally connected to hinge knuckles 25, by means of hinge pins 26. The inclination of the back 24 may be altered by adjusting the stop plates 27, which, as best shown in Fig. 6 of the drawings, are each provided with longitudinal slots 28 and with a foot member 29. The foot member 29 rests on the extension 30 of each knuckle 25. The plate 27 is held in service relation to the members 24, by bolts 31 and wing nuts 32 mounted thereon.

When the seat 12 and parts connected therewith are disposed in the inactive position, the back is moved forward and down to rest upon the seat 12. The plate 28 and foot 29 thereof readily accommodate this movement. The bars 16 pivot on the bolts 22, being disengaged from the bolts 21, to swing away therefrom.

When the bars 16 and parts connected therewith are disposed between the handle bars 11, the V-shaped clips 33 are thrown forward turning on their pivots 34 until the yoke of the clips embraces the handle bars 11 and thereafter serves to hold the seat in the raised position.

*Operation.*

When it becomes necessary to use the seat 12, the clips 33 are moved to release the handle bars 11, and the seat is then lowered to the desired position. The back 23 is lifted to the service position, such as shown in Fig. 2. The seat is now in position to receive a child who has been walking and for resting whom the seat is provided. Should it prove that the inclination of the back is too great, and it is desired to straighten the same, the nuts 32 are loosened to permit the plates 27 to be lowered until the feet 29 thereof rest on the flat extensions of the knuckles 25. The proper adjustment having been arrived at, the nuts 32 are tightened and the back is thereafter held in the approved disposition.

When now the child who has occupied the seat becomes rested and wishes to walk, the seat 12 is re-folded and swung to the inactive position substantially parallel to the handle bars, where it is retained by the clips 33, the same being moved over to engage, by their yokes, the handle bars 11.

When it is desired to change the service angle of the seat 12, this is accomplished by re-arranging the bolts 21 on the plate 17. This requires only that the bolts 21 be moved from one set of perforations 20 to another. It will be understood that the bolts 21 when set serve to form stops for the bars 16, the ends of which extend under the said bolts to be braced thereto.

Claims.

1. An apparatus as characterized comprising a seat member; a plurality of supporting bars therefor; a plurality of bracket bars operatively engaging said supporting bars; a plurality of anchor plates for said bracket bars; means for temporarily mounting said anchor plates in fixed relation to the handle bars of a perambulator; means for adjustably connecting said bracket bars on said anchor plates for supporting said seat and bracket bars connected therewith in horizontal or upright position at will; and means mounted on said seat for locking the seat when lifted to the position parallel with said handle bars.

2. An apparatus as characterized comprising a seat member; a plurality of supporting bars therefor; a plurality of bracket bars operatively engaging said supporting bars; a plurality of anchor plates for said bracket bars; means for temporarily mounting said anchor plates in fixed relation to the handle bars of a perambulator; means for adjustably connecting said bracket bars on said anchor plates for supporting said seat and bracket bars connected therewith in horizontal or upright position at will; and a folding back member pivotally mounted on said seat member and adapted to fold forward thereon.

3. An apparatus as characterized comprising a seat member; a plurality of supporting bars therefor; a plurality of bracket bars operatively engaging said supporting bars; a plurality of anchor plates for said bracket bars; means for temporarily mounting said anchor plates in fixed relation to the handle bars of a perambulator; means for adjustably connecting said bracket bars on said anchor plates for supporting said seat and bracket bars connected therewith in horizontal or upright position at will; a folding back member pivotally connected on said seat member and adapted to fold forward thereon; and an adjustable support for said back member for varying the relation thereof to said seat member.

4. An apparatus as characterized comprising a seat member; a plurality of supporting bars therefor; a plurality of bracket bars operatively engaging said supporting bars; a plurality of anchor plates for said bracket bars; means for temporarily mounting said anchor plates in fixed relation to the handle bars of a perambulator; means for adjustably connecting said bracket bars on said anchor plates for supporting said seat member and said bracket bars connected therewith in horizontal or upright position at will; a folding back member pivotally connected on said seat member and adapted to fold forward thereon; and an adjustable support for said back member for varying the relation thereof to said seat member, said support embodying a slotted plate having an extended foot rest, a bolt permanently attached to said back, and a nut mounted on said bolt to clamp said plate and back in fixed relation.

WILLIAM J. STOLZ.

Copies of this patent may be obtained for five cents each, by addressing the "Commissioner of Patents, Washington, D. C."